Dec. 18, 1934.  R. J. BRITTAIN, JR  1,984,823
JOURNAL BOX
Filed April 29, 1930  4 Sheets-Sheet 1
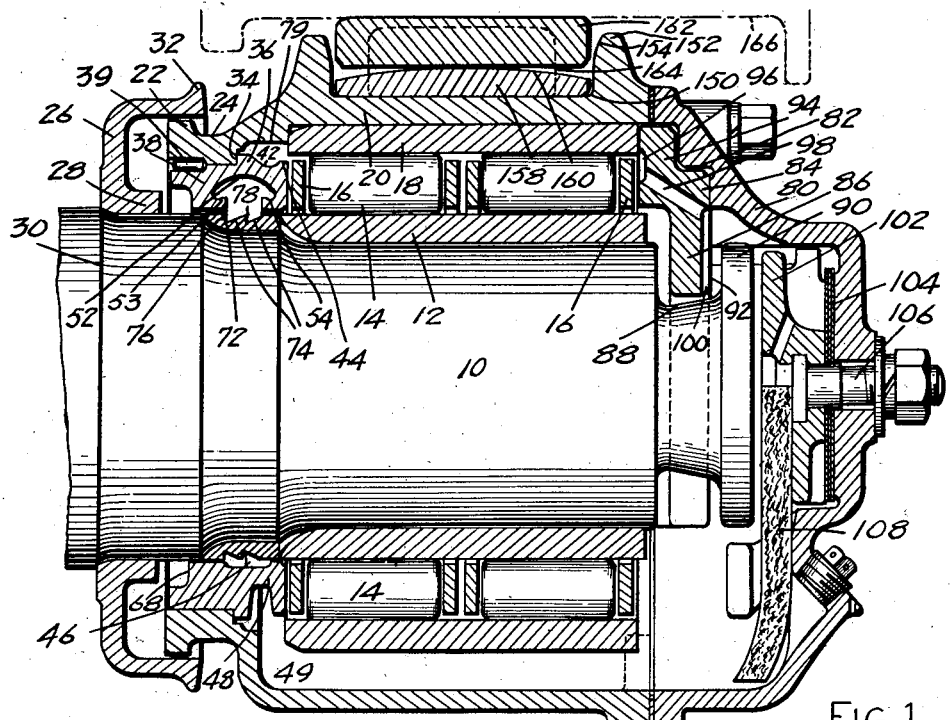
FIG.1.
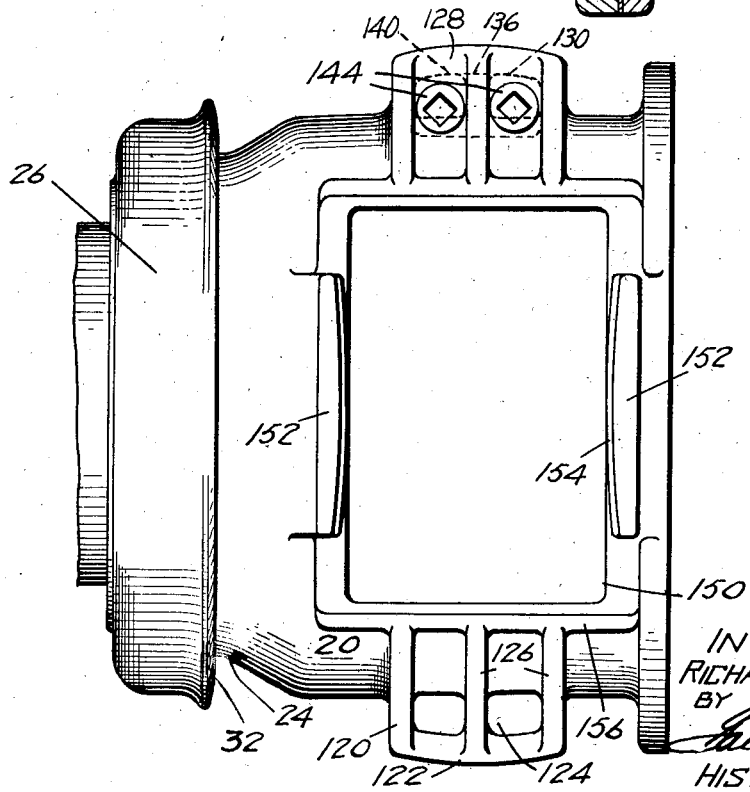
FIG.2.
INVENTOR
RICHARD J. BRITTAIN, JR.,
BY
HIS ATTORNEY.

Dec. 18, 1934.        R. J. BRITTAIN, JR        1,984,823
JOURNAL BOX
Filed April 29, 1930        4 Sheets-Sheet 2
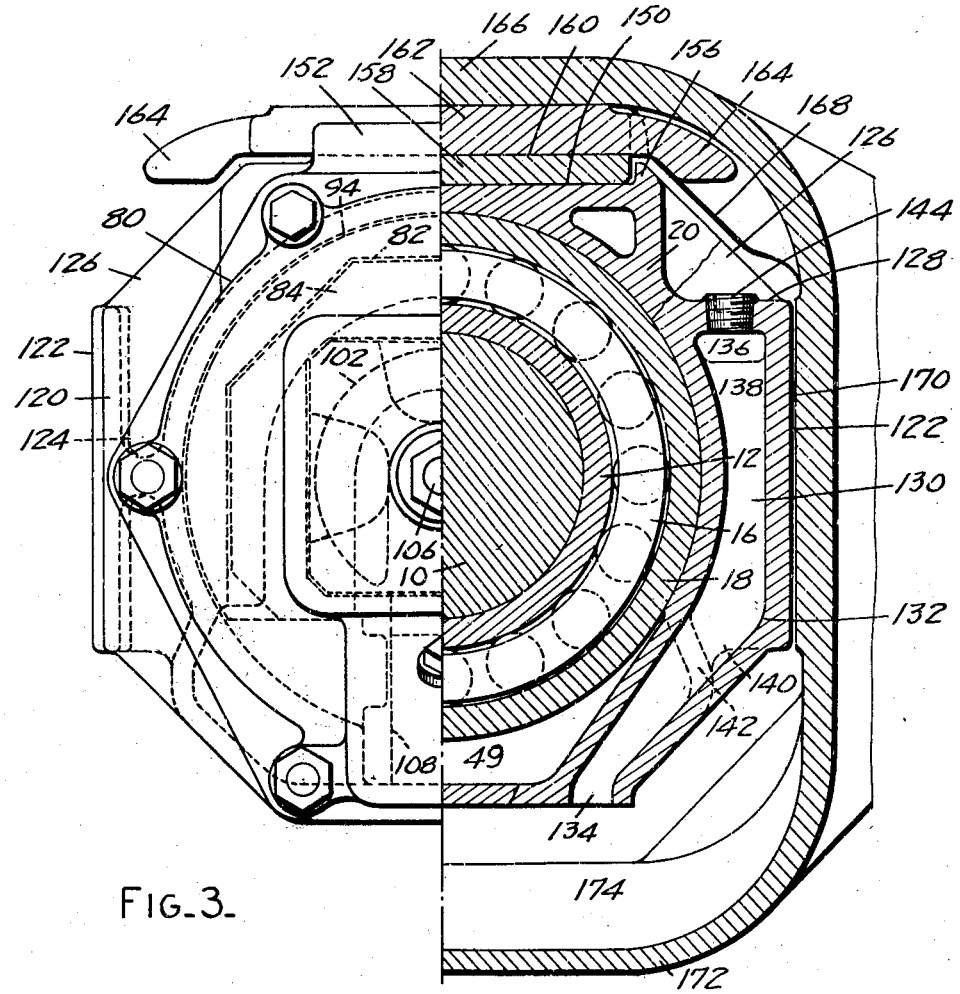
Fig.3.
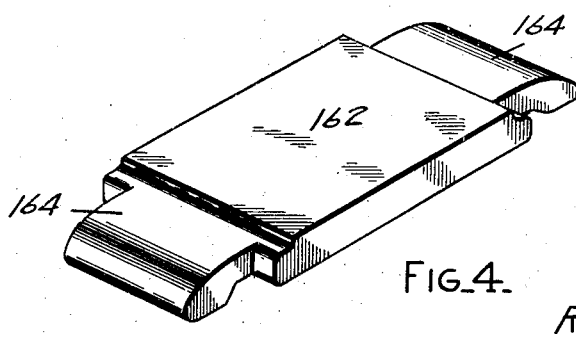
Fig.4.
INVENTOR.
RICHARD J. BRITTAIN, JR,
BY
HIS ATTORNEY.

INVENTOR.
RICHARD J. BRITTAIN, JR.,
BY
HIS ATTORNEY.

Dec. 18, 1934.  R. J. BRITTAIN, JR  1,984,823
JOURNAL BOX
Filed April 29, 1930  4 Sheets-Sheet 4

INVENTOR.
RICHARD J. BRITTAIN, JR,
BY
HIS ATTORNEY.

Patented Dec. 18, 1934

1,984,823

UNITED STATES PATENT OFFICE 1,984,823

JOURNAL BOX

Richard J. Brittain, Jr., Bloomfield, N. J., assignor to General Motors Corporation, Detroit, Mich., a corporation of Delaware Application April 29, 1930, Serial No. 448,240

7 Claims. (Cl. 308—80)

This invention relates to journal boxes and comprises all the features of novelty herein disclosed. An object of the invention is to provide improved sealing means for preventing leakage of lubricant or foreign matter along a shaft which projects into a housing. Another object is to provide an improved closure cap or lubricant collector to trap lubricant at the joint between a shaft and a housing which have relative rotation.

To these ends and to improve generally and in detail upon devices of this character, the invention also consists in the various matters hereinafter described and claimed. In its broader aspects, the invention is not necessarily limited to the specific construction selected for illustrative purposes in the accompanying drawings in which Fig. 1 is a longitudinal vertical section of an axle box.

Fig. 2 is a plan view of the box.

Fig. 3 is an end view of the box, one half being a cross section of the box and an enclosing frame member.

Fig. 4 is a perspective view of a seat plate.

Figure 5:
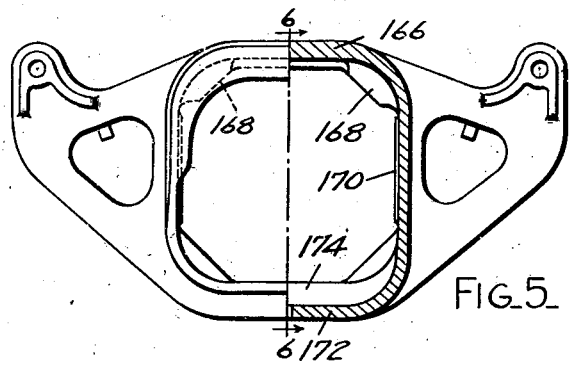
Fig. 5 is a side view and half section, to small scale, of the frame member.
Figure 6:
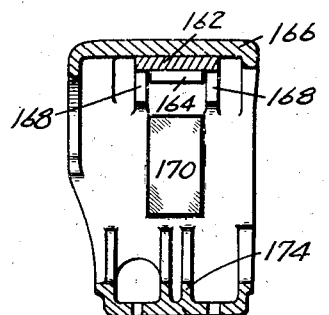
Fig. 6 is a section on the line 6—6 of Fig. 5, with upper seat plate in place.
Figure 9:
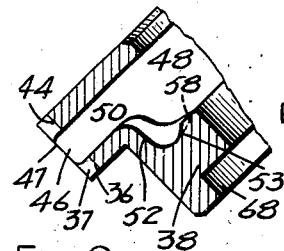
Fig. 9 is a section on the line 9—9 of Fig. 8.
Figure 10:
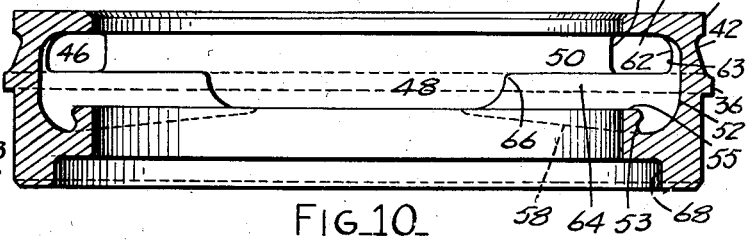
Fig. 10 is a section on the line 10—10 of Fig. 8.
Figure 7:
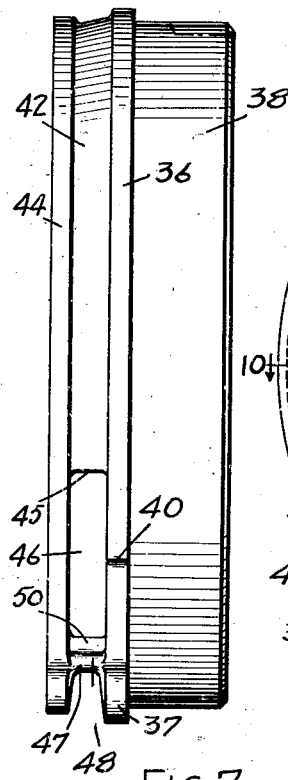
Fig. 7 is a side view of a closure member.
Figure 8:
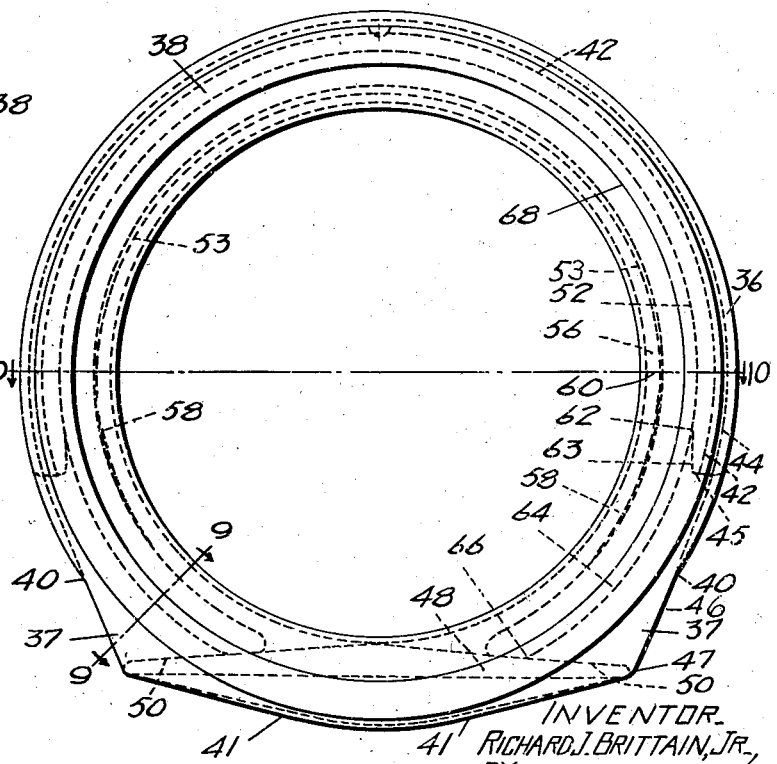
Fig. 8 is a front view of the closure member.
Figures 11, 12:
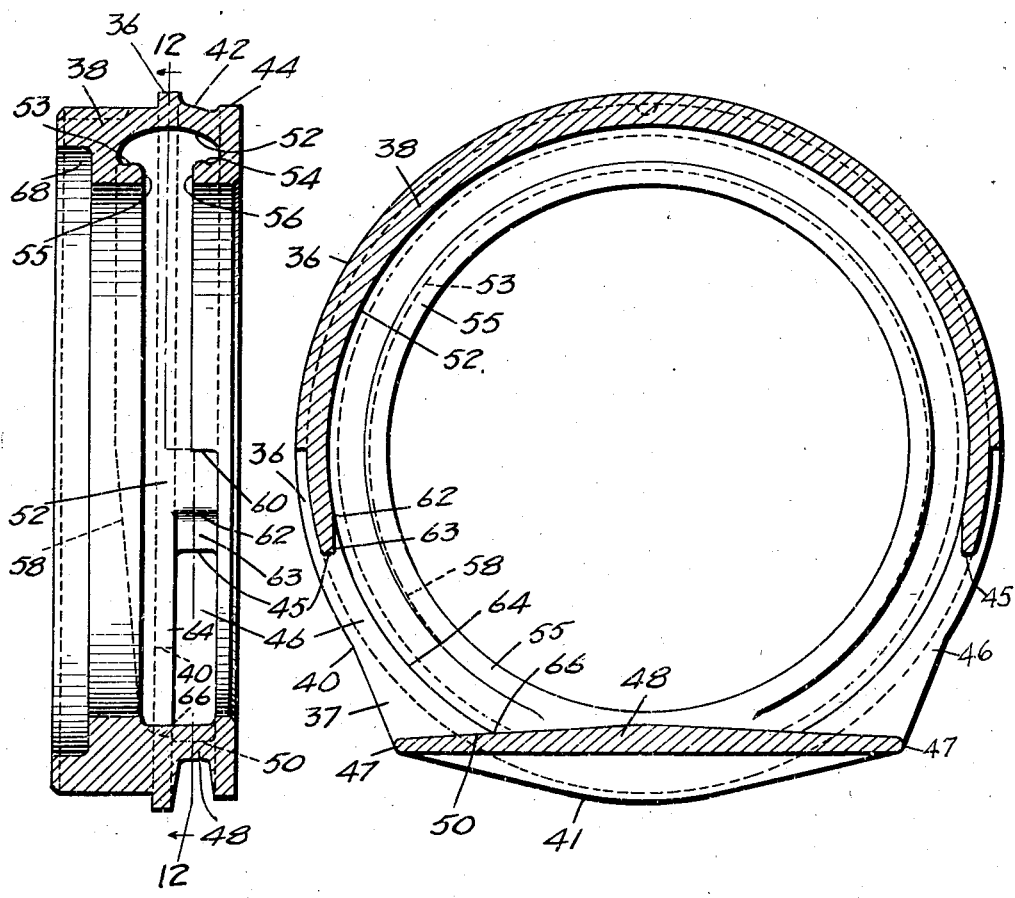
Fig. 11 is a vertical section of the closure member.
Fig. 12 is a section on the line 12—12 of Fig. 11.

The numeral 10 indicates a shaft or axle carrying a raceway sleeve 12 for roller bearings 14 having cage rings 16. The rollers run in an outer raceway sleeve 18 inserted in the bore of a housing or axle box 20 against a shoulder therein. The rear end of the box has an end flange 22 forming a peripheral drain groove 24. A guard ring 26 has a hub 28 pressed on the axle against a rib 30, and an axial flange, terminating in a bead or rib 32, encloses the box flange 22 to exclude water and other foreign matter.

The box has an internal shoulder 34 abutting against a locating rib or flange 36 on a sealing ring or bushing 38 which fits the bore at the end of the box and is held from turning by a dowel pin 39. The flange 36 is circular with the exception of substantially triangular extensions 37 between the points 40 and 41. At one side of the flange 36 is a slanting wall forming an external arcuate groove 42 bounded laterally by a flange 44 and terminating at the edges 45 of openings 46 through the bushing. The flange 44 is shaped like the flange 36 but is of smaller diameter. The openings 46 extend from the points 45 to points 47 which are the lateral termini of a cross wall 48. The wall 48 forms a dam or obstruction to lubricant splashing upwardly from a lubricant reservoir 49 and a portion of its upper surface slopes downwardly in opposite directions from a point directly under the axle to form drain surfaces 50 leading to the openings 46. This is to drain lubricant to the reservoir after being thrown off from the axle and trapped, as will appear.

Internally, the bushing has an arcuate inwardly facing drain groove 52 whose walls are reversely curved to form narrow outwardly facing trap grooves 53 and 54 which extend inside of the drain groove 52 and are spaced apart at the terminal edges 55 and 56. The trap groove 53 is semi-circular and of uniform size over the upper half of the bushing but, below the center line, its side wall slants as at 58 to make the groove fade out at the edge 55 near the cross wall 48. This occurs at both sides, the bushing being symmetrical about a vertical center line. The trap groove 54 is of uniform size and semi-circular over the upper half of the bushing, its ends terminating short off at 60. The internal groove 52, or that half of it nearest to trap groove 54, continues in arcuate form to the points 62 where each end becomes a straight vertical wall 63 terminating at the edge 45 of the opening 46. The remaining portion 64 of the internal groove 52 at the side of the opening 46 continues in arcuate form to merge with the cross wall 48 at 66. The bushing has an annular recess at 68 and its bore has running clearance with a sleeve 72 held on the shaft 10. The sleeve 72 has a plurality of grooves formed by conical faces 74 meeting flat radial faces 76, thus leaving a slinger rib 78 opposite to the internal groove 52. The conical faces tend to prevent lubricant from working along the sleeve 72 and out of the box.

Some of the lubricant thrown from the rib 78 runs peripherally in the groove 52 and one portion continues down the vertical walls 63 to drop through the openings 46 while another portion runs down the groove portion 64 to the inclined drain surfaces 50. Some of the lubricant runs laterally of the groove 52 into the trap grooves 53 and 54. From the trap groove 54, lubricant drops from the terminal points 60 through the openings 46. From the trap groove 53, lubricant is guided laterally by the inclined walls 58 to the inclined drain surfaces 50. Lubricant thrown from the rib 78 at the low point directly under the axle (where gravity aids the ejection) is directed substantially tangentially or in the direction of slant of one of the drain surfaces 50 (depending on direction of rotation of the axle). All lubricant received in the bushing is thus returned to the reservoir 49 at the bottom of the box. The external groove 42 and a surrounding arcuate surface 79 of the box form a relief space by which excess lubricant working axially out of the bearing sleeve 18 is returned to the reservoir.

The front end of the box is closed by an end cap 80 having internal flat faces 82 engaging corresponding flat faces on a thrust plate 84 to prevent rotation of the latter. The thrust plate is U-shaped with an extension 86 entering a groove 88 of the axle adjacent to a collar 90. The extension has a flat thrust face 92 to engage an opposing thrust face on the collar 90 for limiting endwise movement of the axle in one direction. The thrust plate has an outer portion 94 which is partly in the end cap and partly in the bore of the box, a groove 96 receiving lubricant from the bearings and conducting it through an inclined passage 98 to a groove 100 in the thrust face 92. The axle groove 88 has a conical inner wall so that lubricant, running down to it over the end of the raceway sleeve 12, will work out to the thrust face on axle collar 90. Outward thrust of the axle is taken on a thrust block 102 clamped against spacing plates 104 in the end cap by a stud 106. A lubricating wick 108 extends from the thrust block to the bottom of the end cap which supplements the lubricant reservoir 49.

The opposite sides of the box have enlargements or extensions 120 the outer faces 122 of which are cylindrically convexed or crowned so that the box can twist around a vertical axis as will appear. One side of the box has recesses 124 between bracing ribs or webs 126. The other side of the box has a flat top wall 128 closing the top of a generally vertical passage 130 which widens out at 132 and communicates with the atmosphere at a bottom opening 134. The upper portion of the passage 130 widens out and communicates with a short horizontal opening 136 in the rear wall 138 of the passage 130. The horizontal opening communicates with a second vertical passage 140 back of the partition or wall 138, the passage 140 being of a shape similar to passage 130 down as far as a lateral opening 142 communicating with the interior of the box. Threaded plugs 144 in the top wall 128 are to close the chambered box extension after casting operations. The passages form a breather or device to let air enter the box or leave it freely when the axle shifts endwise therein. This prevents the piston-like action of the axle from sucking in foreign matter or blowing out oil at the axle seal. The wide sections in the passages diminish the velocity of the air at such points and so tend to release foreign matter suspended therein.

The box is mounted for universal movement with respect to a car frame structure. The top of the box has a rectangular recess 150 bounded at the ends by cross ribs 152 which are rounded or crowned both vertically and laterally as indicated at 154. The sides of the recess are bounded by ribs 156 to retain a lower seat plate 158. The seat plate has its upper surface 160 cylindrically crowned longitudinally of the axle to form a rocking support for an upper seat plate 162. The crowned faces 154 on the cross ribs 152 allow a relative twisting movement between the box and the seat plate 162 as well as a relative rocking movement longitudinally of the axle. This universal mounting prevents cramping of the axle bearings and consequent overloading. The upper seat plate has narrowed side lugs or extensions 164 which also project downwardly to clear interior corners in a casting or yoke 166 which is supported on the flat upper face of the upper seat plate. The narrowed side extensions project between pairs of inclined ribs 168 at the interior corners of the casting 166 to prevent relative shifting of the seat plate and casting. The interior side walls of the casting have flat faces 170 closely embracing the box but permitting a twisting of the box around a vertical axis by reason of the crowned side faces 122 on the box. The casting has a bottom wall 172 and reinforcing ribs 174 which have clearance with the box bottom to permit of the various motions. The casting is especially designed for mounting on the center axle of a six wheeled truck and for connection to side frames thereof but, per se, is not a part of the present invention.

I claim:

1. In a device of the character described, a shaft, a housing enclosing a portion of the shaft and supporting the shaft for rotation, a closure member for sealing the space between the shaft and the housing, the closure member having an internal drain groove receiving lubricant from the shaft, the closure member having a trap groove extending inside of the drain groove and open outwardly towards the drain groove to receive lubricant therefrom, the trap groove fading out at the lower portion of the closure member, and the closure member having an inclined cross wall below said terminus of the trap groove; substantially as described.

2. In a device of the character described, a shaft, a housing enclosing a portion of the shaft and supporting the shaft for rotation, a closure member for sealing the space between the shaft and the housing, the closure member having an internal drain groove receiving lubricant from the shaft, the opposite sides of the drain groove being reversely curved to form outwardly facing trap grooves extending inside of the drain groove to receive lubricant therefrom, and the trap grooves having their lower portions communicating with drain openings extending through the opposite sides of the closure member; substantially as described.

3. In a device of the character described, a shaft, a housing enclosing a portion of the shaft and supporting the shaft for rotation, a closure member for sealing the space between the shaft and the housing, the closure member having an internal drain groove receiving lubricant from the shaft, the closure member having a trap groove extending inside of the drain groove and open outwardly towards the drain groove to receive lubricant therefrom, said trap groove being arcuate over the upper portion of the closure member and each end of the trap groove terminating over a drain opening extending through the closure member at a point to one side of the shaft; substantially as described.

4. In a device of the character described, a shaft, a housing enclosing a portion of the shaft, a bearing providing for relative rotation between the shaft and the housing, the body of the housing having an enlargement at the side, the enlargement containing a pair of vertical passages communicating with one another at the top, one passage being open at its lower end to the outside of the housing, the other passage being open at its lower end to the interior of the housing, and the passages being substantially equidistant from the shaft; substantially as described.

5. In a device of the character described, a shaft, a housing enclosing a portion of the shaft, a bearing providing for relative rotation between the shaft and the housing, the body of the housing having an enlargement at the side, the enlargement containing a pair of vertical passages, the outer wall of the enlargement forming the outer wall of both passages, one passage being open at its lower end to the outside of the housing, the other passage being open at its lower end to the interior of the housing, and the passages communicating with one another at their upper ends; substantially as described.

6. In a device of the character described, a shaft, a housing enclosing a portion of the shaft, a bearing providing for relative rotation between the shaft and the housing, the body of the housing having an enlargement at the side, the enlargement containing a pair of vertical passages, the outer wall of the enlargement forming the outer wall of both passages, one passage being open at its lower end to the outside of the housing, the other passage being open at its lower end to the interior of the housing, the passages communicating with one another at their upper ends, and at least one of the passages being wider at its intermediate portion than at the ends thereof; substantially as described.

7. In a device of the character described, a shaft, a housing enclosing a portion of the shaft, a bearing providing for relative rotation between the shaft and the housing, the body of the housing having an enlargement at the side, the enlargement containing a pair of vertical passages, each closed at one end but communicating laterally with the other at such closed end, one passage having its remaining end open to the interior of the housing and the other passage having its remaining end open to the outside of the housing; substantially as described.

RICHARD J. BRITTAIN, JR.